US012411698B2

(12) United States Patent
Sproch et al.

(10) Patent No.: US 12,411,698 B2
(45) Date of Patent: Sep. 9, 2025

(54) STATIC RECONCILLIATION OF APPLICATION VIEW HIERARCHIES

(71) Applicant: Google LLC, Mountain View, CA (US)

(72) Inventors: James Richard Sproch, Mountain View, CA (US); Chuck Paul Jazdzewski, Campbell, CA (US); Leland Richardson, San Francisco, CA (US)

(73) Assignee: Google LLC, Mountain View, CA (US)

( * ) Notice: Subject to any disclaimer, the term of this patent is extended or adjusted under 35 U.S.C. 154(b) by 7 days.

(21) Appl. No.: 17/273,608

(22) PCT Filed: Apr. 25, 2019

(86) PCT No.: PCT/US2019/029228
§ 371 (c)(1),
(2) Date: Mar. 4, 2021

(87) PCT Pub. No.: WO2020/219059
PCT Pub. Date: Oct. 29, 2020

(65) Prior Publication Data
US 2021/0365277 A1 Nov. 25, 2021

(51) Int. Cl.
*G06F 9/451* (2018.01)
*G06F 8/20* (2018.01)
(Continued)

(52) U.S. Cl.
CPC ............... *G06F 9/451* (2018.02); *G06F 8/24* (2013.01); *G06F 8/38* (2013.01); *G06F 8/4443* (2013.01); *G06F 8/75* (2013.01)

(58) Field of Classification Search
CPC ... G06F 9/451; G06F 8/24; G06F 8/38; G06F 8/4443; G06F 8/75
(Continued)

(56) References Cited

U.S. PATENT DOCUMENTS

| 10,002,115 B1 | 6/2018 | Killian et al. |
| 2003/0177175 A1 | 9/2003 | Worley et al. |
| | (Continued) | |

FOREIGN PATENT DOCUMENTS

| CN | 101996073 A | 3/2011 |
| CN | 105354013 A | 2/2016 |
| | (Continued) | |

OTHER PUBLICATIONS

Response to Communication Pursuant to Rules 161(1) and 162 EPC dated Mar. 25, 2021, from counterpart European Application No. 19730589.9, filed Sep. 20, 2021, 18 pp.
(Continued)

*Primary Examiner* — Stephen S Hong
*Assistant Examiner* — Tionna M Burke
(74) *Attorney, Agent, or Firm* — Shumaker & Sieffert, P.A.

(57) ABSTRACT

A system is described that performs static reconciliation for rendering a graphical user interface (GUI) of an application. The system compiles source code associated with the GUI of an application into rendering instructions for rendering a view hierarchy of the GUI. The view hierarchy defines graphical components of the GUI, and the rendering instructions include initial rendering instructions for rendering the graphical components during an initial rendering of the GUI, and update rendering instructions for rendering a subset of the graphical components during subsequent renderings of the GUI. The system may automatically assign a respective key to one or more of the subset of graphical components, where the update rendering instructions for rendering each of the one or more of the subset of graphical components are uniquely identifiable according to the respective key. The system executes the rendering instructions to update the graphical components identified by the respective key.

17 Claims, 4 Drawing Sheets

(51) Int. Cl.
*G06F 8/38* (2018.01)
*G06F 8/41* (2018.01)
*G06F 8/75* (2018.01)

(58) Field of Classification Search
USPC .......................................................... 715/762
See application file for complete search history.

(56) References Cited

U.S. PATENT DOCUMENTS

| | | | | |
|---|---|---|---|---|
| 2007/0094608 | A1* | 4/2007 | Getsch .................... | G06F 9/451 |
| | | | | 707/999.1 |
| 2009/0259950 | A1* | 10/2009 | Sullivan .................... | G06F 8/38 |
| | | | | 715/762 |
| 2011/0131548 | A1* | 6/2011 | Colton ...................... | G06F 8/52 |
| | | | | 717/146 |
| 2011/0321024 | A1* | 12/2011 | Knothe .................... | G06F 8/656 |
| | | | | 715/864 |
| 2018/0196644 | A1 | 7/2018 | Bhakar et al. | |
| 2019/0303446 | A1* | 10/2019 | Franz ..................... | G06F 40/274 |
| 2019/0369969 | A1* | 12/2019 | Donohoe .................. | G06F 8/33 |

FOREIGN PATENT DOCUMENTS

| | | |
|---|---|---|
| CN | 107391114 A | 11/2017 |
| CN | 108228188 A | 6/2018 |

OTHER PUBLICATIONS

International Preliminary Report on Patentability from International Application No. PCT/US2019/029228, mailed Nov. 4, 2021, 8 pp.
Response to First Office Action and Search Report dated Feb. 22, 2022, from counterpart Indian Application No. 202147011342 filed May 20, 2022, 14 pp.
First Office Action and Search Report, and translation thereof, from counterpart Indian Application No. 202147011342 dated Feb. 22, 2022, 7 pp.
International Search Report and the Written Opinion for counterpart International Application No. PCT/US2019/029228, dated Jan. 21, 2020, 13 pgs.
Notice of Intent to Grant and Text Intended to Grant from counterpart European Application No. 19730589.9 dated Oct. 17, 2022, 45 pp.
Response to Official Hearing dated Aug. 5, 2024, from counterpart Indian Application No. 202147011342 filed Aug. 20, 2024, 8 pp.
Chen et al., "Fast Ray Tracing Technology for Dynamic Scenes", Journal of HuaZhong Normal University (Natural Sciences), vol. 45, No. 2, Jun. 30, 2011, 1-10 pp., Translation provided for only the Abstract.
First Office Action and Search Report, and translation thereof, from counterpart Chinese Application No. 201980066348.1 dated Apr. 30, 2024, 19 pp.
Ma, "Research on Real-time Dynamic Reflection Technology with Realistic Rendering in Virtual Reality", Journal of Xi'an University (Natural Science Edition), vol. 22, No. 2, Mar. 31, 2019, pp. 62-66, Translation provided for only the Abstract.
Hearing Notice from counterpart Indian Application No. 202147011342 dated Jun. 19, 2024, 3 pp.
Second Office Action, and translation thereof, from counterpart Chinese Application No. 201980066348.1 dated Oct. 30, 2024, 12 pp.
Response to Second Office Action, and machine translation thereof, dated Oct. 30, 2024, from counterpart Chinese Application No. 201980066348.1 filed Dec. 30, 2024, 8 pp.
Decision of Rejection, and translation thereof, from counterpart Chinese Application No. 201980066348.1 dated Feb. 6, 2025, 12 pp.
Response to Office Action, and translation there of, dated Feb. 6, 2025, from counterpart Chinese Application No. 201980066348.1 filed May 6, 2025, 26 pp.
Notice of Intent to Grant, and translation thereof, from counterpart Chinese Application No. 201980066348.1 dated Jul. 3, 2025, 7 pp.

* cited by examiner

```
public class AboutPageComponent: Component() {
    @Attribute lateinit var appVersion: String
    override public fun render() {
        <LinearLayout padding="6dp">
            <ImageView src={R.drawable..app_logo} />
            <LinearLayout orientation="vertical">
                <TextView text="My Fancy App Name" textSize="22pt" />
                <TextView text={"Version: "+appVersion} color="#A5A5A5" />
                <TextView text="My app is a todo list that is very fancy." />
            </LinearLayout>
        </LinearLayout>
    }
}
```
216

```
@Generated
fun initialRender() {
    this.root = LinearLayout()
    this.root.setPadding("6dp")
    this.img = ImageView()
    this.img.setImageResource(R.drawable.app_logo)
    this.root.addView(img)
    this.vlayout = LinearLayout()
    this.vlayout.setOrientation(LinearLayout.VERTICAL)
    ...
}
```
218A

```
@Generated
fun updateRender() {
    this.text2.setText("Version: "+appVersion)
}
```
218B

FIG. 2

STATIC RECONCILLIATION OF APPLICATION VIEW HIERARCHIES

BACKGROUND

Some applications, or other types of computer programs, provide a graphical user interface (GUI). The graphical user interface may be represented as a tree of GUI views, also referred to as a "view hierarchy". As the state of an application changes (e.g., due to user inputs, in response operating system commands, because of data from a remote server, etc.) a reconciler may perform "reconciliation" prior to rendering of a GUI to update components of an application's view hierarchy to accommodate the change. Reconciliation can be complicated and prone to error, particularly when a change in application data impacts a rendering of multiple, different GUI views. As such, reconciliation can involve complex processes and be a performance bottle neck when managing and rendering an application GUI.

SUMMARY

Techniques are described for implementing "static reconciliation" for rendering application GUIs. During compilation of application source code, an example compiler may divide a view hierarchy into static and dynamic objects. Static objects may be attributed to components of a GUI that do not change appearance after initially being rendered (e.g., company logos, menu options, etc.). Dynamic objects, however, may be tied to components of a GUI that can and sometimes do change in appearance from one render to the next (e.g., text fields, animations, etc.).

The example compiler may generate application machine-code that causes an application, at run-time, to execute two different sets of rendering instructions. The application may execute a set of initial rendering instructions to render all of the static and dynamic components defined by an actual view hierarchy. Upon receiving a desired view hierarchy for subsequent rendering, however, the application may execute a different set of rendering instructions or set of update rendering instructions. The set of update rendering instructions is a subset of the set of initial rendering instructions and includes only the instructions necessary to re-render the objects of dynamic component, because only the objects of dynamic components can change between renderings. In this way, static reconciliation may enable an application to only have to allocate a reduced quantity of objects when rendering GUI components defined by a view hierarchy, when compared to a total quantity of objects that would otherwise need to be allocated if the application were to render its view hierarchy, using other reconciliation techniques. In one example, the disclosure is directed to a method for performing static reconciliation for rendering a graphical user interface of an application, the method including: receiving, by at least one processor, source code associated with the graphical user interface of an application; compiling the source code into a plurality of rendering instructions for rendering a view hierarchy of the graphical user interface, wherein the view hierarchy defines graphical components of the graphical user interface, and wherein the plurality of rendering instructions include: a set of initial rendering instructions for rendering the graphical components, during an initial rendering of the graphical user interface; and a set of update rendering instructions for rendering a subset of the graphical components, during subsequent renderings of the graphical user interface; automatically assigning, during compilation of the source code, a respective key to one or more of the subset of graphical components, wherein the set of update rendering instructions for rendering each of the one or more of the subset of graphical components are uniquely identifiable according to the respective key; and executing the plurality of rendering instructions for displaying the graphical user interface of the application.

In another example, the disclosure is directed to a computing system that includes at least one processor configured to perform static reconciliation for rendering a graphical user interface of an application by at least: receiving source code associated with the graphical user interface of an application, and compiling the source code into a plurality of rendering instructions for rendering a view hierarchy of the graphical user interface. The view hierarchy defines graphical components of the graphical user interface, and the plurality of rendering instructions include: a set of initial rendering instructions for rendering the graphical components, during an initial rendering of the graphical user interface, and a set of update rendering instructions for rendering a subset of the graphical components, during subsequent renderings of the graphical user interface. The at least one processor may further be configured to automatically assign, during compilation of the source code, a respective key to one or more of the subset of graphical components, wherein the set of update rendering instructions for rendering each of the one or more of the subset of graphical components are uniquely identifiable according to the respective key. The at least one process is further configured to perform static reconciliation for rendering the graphical user interface of the application by executing the plurality of rendering instructions to update the one or more of the subset of graphical components identified by the respective key.

In another example, the disclosure is directed to a computer-readable storage medium including instructions that, when executed, cause at least one processor of a computing system to perform static reconciliation for rendering a graphical user interface of an application by at least: receiving source code associated with the graphical user interface of an application, and compiling the source code into a plurality of rendering instructions for rendering a view hierarchy of the graphical user interface. The view hierarchy defines graphical components of the graphical user interface, and the plurality of rendering instructions include: a set of initial rendering instructions for rendering the graphical components, during an initial rendering of the graphical user interface, and a set of update rendering instructions for rendering a subset of the graphical components, during subsequent renderings of the graphical user interface. The instructions, when executed, further cause the at least one processor to automatically assign, during compilation of the source code, a respective key to one or more of the subset of graphical components, wherein the set of update rendering instructions for rendering each of the one or more of the subset of graphical components are uniquely identifiable according to the respective key. The instructions, when executed, further cause the at least one processor to perform static reconciliation for rendering the graphical user interface of the application by executing the plurality of rendering instructions to update the one or more of the subset of graphical components identified by the respective key.

In another example, the disclosure is directed to a system for performing static reconciliation for rendering a graphical user interface of an application, the system including: means for receiving source code associated with the graphical user interface of an application and means for compiling the source code into a plurality of rendering instructions for rendering a view hierarchy of the graphical user interface. The view hierarchy defines graphical components of the graphical user interface, and the plurality of rendering instructions include: a set of initial rendering instructions for rendering the graphical components, during an initial rendering of the graphical user interface and a set of update rendering instructions for rendering a subset of the graphical components, during subsequent renderings of the graphical user interface. The system may further include means for automatically assigning, during compilation of the source code, a respective key to one or more of the subset of graphical components, wherein the set of update rendering instructions for rendering each of the one or more of the subset of graphical components are uniquely identifiable according to the respective key. The system further includes means for executing the plurality of rendering instructions to update the one or more of the subset of graphical components identified by the respective key.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 2 is a conceptual diagram illustrating example source code that has been separated into a set of initial rendering instructions and a set of update rendering instructions for performing static reconciliation to render a graphical user interface of an application, in accordance with techniques of the disclosure.

DETAILED DESCRIPTION

Figure 1:
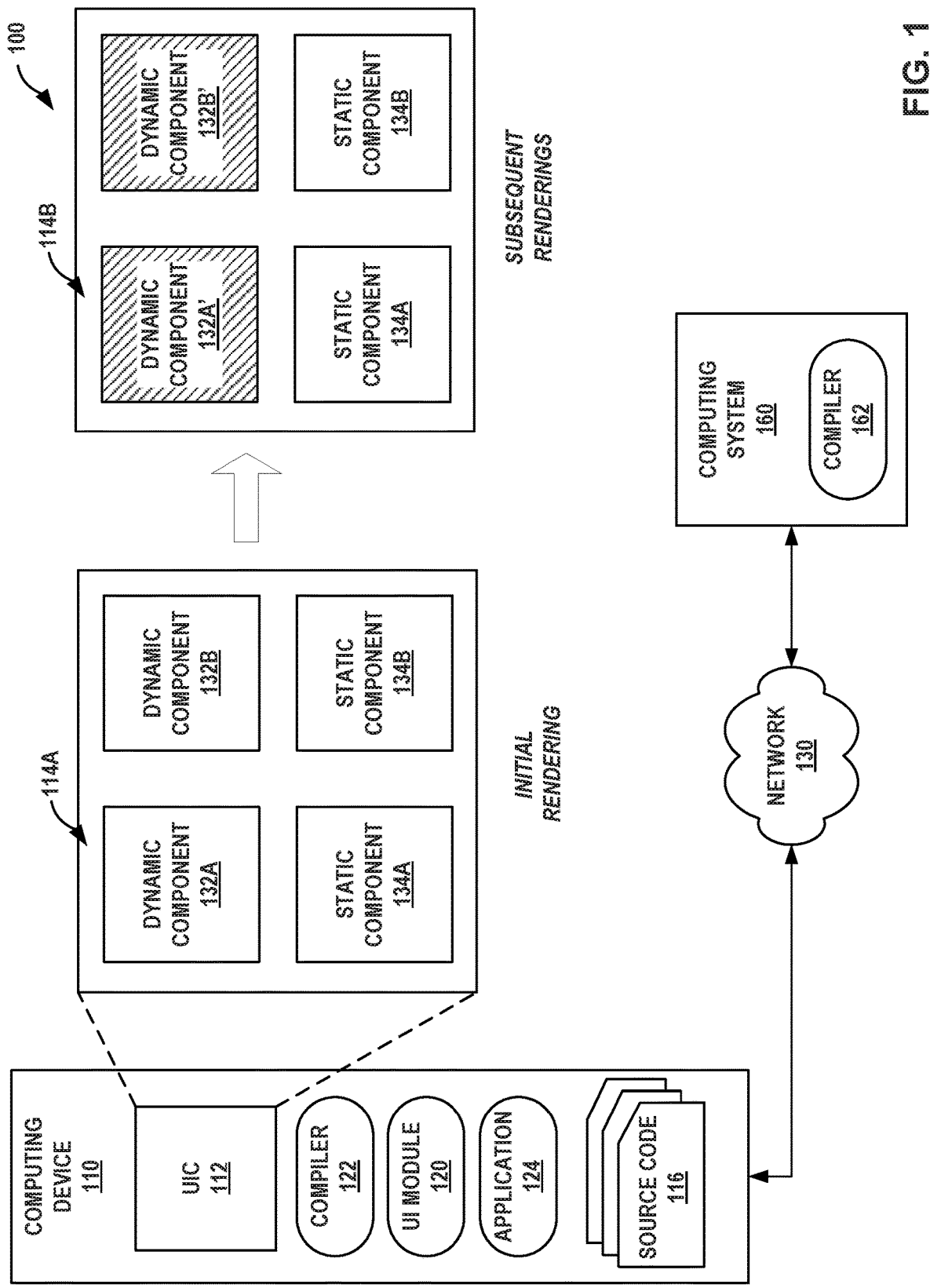
FIG. 1 is a conceptual diagram illustrating an example system configured to perform static reconciliation for rendering a graphical user interface of an application, in accordance with techniques of the disclosure.

Reconciliation is a process performed, by a reconciler, during rendering of a view hierarchy. Declarative reconciliation includes comparing a previous view hierarchy to a desired GUI hierarchy (e.g., emitted from a GUI component's render function) to determine a set of mutations that a reconciler may perform to transform the previous view hierarchy into the desired view hierarchy. From a user perspective, reconciliation may be an undiscoverable implementation detail. However, reconciliation can be complex and cause a performance bottle neck when managing and rendering a GUI.

Some reconcilers perform "naïve unoptimized reconciliation". In naïve unoptimized reconciliation, each time a view hierarchy is rendered (e.g., once every sixtieth of a second for animations, etc.), a reconciler will recreate or instantiate an entirely new view hierarchy, from scratch. The reconciler may walk a previously instantiated view hierarchy, and the new view hierarchy, to determine which GUI views of the previous view hierarchy require rendering, to reflect the desired view hierarchy. Essentially, any time an application GUI requires rendering, a naïve-optimization-reconciler may instantiate an entirely new tree of GUI views, even if only some of the GUI views require a change. Naïve unoptimized reconciliation is computationally intensive and may consume an increased amount of processing resources to recreate or instantiate an entire view hierarchy, each and every time application data changes or a GUI needs rendering.

Instead of instantiating an entirely new view hierarchy for each render, some reconcilers perform virtual document object model (VDOM) reconciliation. In "VDOM reconciliation" a reconciler allocates and maintains a VDOM tree that represents an actual (i.e., currently instantiated) view hierarchy maintained by the application. During each rendering, rather than instantiating a second view hierarchy, the reconciler allocates an entirely new VDOM tree that represents a desired view hierarchy. The reconciler may traverse the desired and actual VDOM trees to identify differences between the two. The reconciler may then manipulate the actual, instantiated view hierarchy, based on the identified differences in the two VDOM trees, to render the actual view hierarchy as the desired view hierarchy. By allocating VDOM trees and running comparisons between VDOM trees, as opposed to instantiating and comparing multiple view hierarchies in their entirety, as is done during naïve unoptimized reconciliation, a reconciler may have improved performance.

Rather than perform VDOM reconciliation, as described above, this disclosure is directed to improving reconciliation performance and reducing reconciliation complexity even further by performing "static reconciliation" techniques. Static reconciliation enables applications to render and update GUI view hierarchies, by allocating only a subset of objects that would otherwise have to be allocated to perform VDOM reconciliation. When rendering a view hierarchy in accordance with static reconciliation techniques, an application can refrain from regularly allocating multiple VDOM trees during each and every render; the application can instead render a view hierarchy once, and then during each subsequent render, regularly allocate just a subset (e.g., a minimum quantity) of the total objects that are needed to define the dynamic components of a GUI, and ignoring the static components of the GUI, because only the dynamic components may change from one rendering to another rendering of the GUI. An application that benefits from static reconciliation may execute a set of initial rendering instructions to initially render all dynamic and static objects of a view hierarchy. During each subsequent rendering however, the application executes a set of update rendering instructions to evaluate any objects associated with dynamic components of the GUI that may have changed without evaluating any of the objects that remain static.

FIG. 1 is a conceptual diagram illustrating an example system configured to perform static reconciliation for rendering a graphical user interface of an application, in accordance with techniques of the disclosure. System 100 includes computing system 160 in communication, via network 130, with computing device 110. Although operations attributed to system 100 are described primarily as being performed by a single computing device 110 and/or a single computing system 160, in some examples, the operations of system 100 may be performed by additional or fewer computing devices and computing systems than what is shown in FIG. 1. For example, some of the operations attributed to computing device 110 may be performed by computing system 160, or vice versa.

Network 130 represents any public or private communications network, for instance, cellular, Wi-Fi, and/or other types of networks, for transmitting data between computing systems, servers, and computing devices. Network 130 may include one or more network hubs, network switches, network routers, or any other network equipment, that are operatively inter-coupled thereby providing for the exchange of information between computing system 160 and computing device 110. Computing system 160 and computing device 110 may transmit and receive data across network 130 using any suitable communication techniques.

Computing system 160 and computing device 110 may each be operatively coupled to network 130 using respective network links. The links coupling computing system 160 and computing device 110 to network 130 may be Ethernet, ATM or other types of network connections, and such connections may be wireless and/or wired connections.

Computing system 160 includes remote compiler module 162. Computing device 110 includes local compiler module 122, user interface (UI) module 120, application module 124, and user interface component ("UIC") 112. UIC 112 is configured to output user interfaces 114A and 114B (collectively "user interfaces 114").

Computing system 160 represents any combination of one or more computers, mainframes, servers (including so-called "blades"), cloud computing systems, or other types of remote computing systems capable of exchanging information via network 130 as part of a remote computing service. For example, computing system 160 may provide access to an application developer service (e.g., an application builder service, a compiler service, a debug service, etc.) to which a client device, such as computing device 110, can upload source code for compilation by computing system 160 and from which the client device may download an application executable or package, that the client device may then execute locally on-device.

Computing device 110 represents any suitable computing device or computing system capable of exchanging information via network 130 to access the remote computing service provided by computing system 160. For example, computing device 110 may be a mobile device from which a user provides inputs to interact with a user interface associated with computing system 160, e.g., to cause computing device 110 to download application executables compiled by computing system 160, for local installation on computing device 110. Examples of computing device 110 include mobile phones, tablet computers, laptop computers, desktop computers, servers, mainframes, blades, wearable devices (e.g., computerized watches etc.), home automation devices, assistant devices, gaming consoles and systems, media players, e-book readers, television platforms, automobile navigation or infotainment systems, or any other type of mobile, non-mobile, wearable, and non-wearable computing devices configured to execute applications.

UIC 112 of computing device 110 may function as an input and/or output device for computing device 110. UIC 112 may be implemented using various technologies. For instance, UIC 112 may function as an input device using presence-sensitive input screens, microphone technologies, infrared sensor technologies, or other input device technology for use in receiving user input. UIC 112 may function as output device configured to present output to a user using any one or more display devices, speaker technologies, haptic feedback technologies, or other output device technology for use in outputting information to a user.

Modules 120, 122, 124, and 162 may perform operations described herein using software, hardware, firmware, or a mixture of hardware, software, and firmware residing in and/or executing at computing device 110 and computing system 160. Computing device 110 and computing system 160, may execute, respectively, modules 120, 122, and 124, and module 162 with multiple respective processors or multiple respective devices, as respective virtual machines executing on underlying hardware, as one or more respective services of an operating system or computing platform, and/or as one or more respective executable programs at an application layer of a respective computing platform.

UI module 120 of computing device 110 controls UIC 112 including determining what UIC 112 presents and what information is exchanged between UIC 112 and other applications or components of computing device 110, such as application module 124 and compiler module 122. For example, in controlling what UIC 112 displays, UI module 120 may receive information from application module 124 that forms a basis for some or all of user interfaces 114A. In response, UI module 120 may output instructions and information to UIC 112 that cause UIC 112 to display user interfaces 114 according to the information received from application module 124. When handling input detected by UIC 112, UI module 120 may receive information from UIC 112 in response to inputs detected at locations of a presence-sensitive input component of UIC 112 that correspond to locations of a display component of UIC 112 at which elements of user interfaces 114 are displayed. UI module 120 disseminates information about inputs detected by UIC 112 to other components of computing device 110 for interpreting the inputs and for causing computing device 110 to perform one or more functions in response to the inputs.

In some examples, UI module 120 may receive an indication of one or more user inputs detected at UIC 112 and may output information about the user inputs to compiler module 122, application module 124, any other application or component of computing device 110 for which the user inputs are intended. For example, UIC 112 may detect a user input and send data about the user input to UI module 120. UI module 120 may generate one or more touch events based on the detected input. A touch event may include information that characterizes user input, such as a location component (e.g., [x,y] coordinates) of the user input, a time component (e.g., when the user input was received), a force component (e.g., an amount of pressure applied by the user input), or other data (e.g., speed, acceleration, direction, density, etc.) about the user input. Based on location information of the touch events generated from the user input, UI module 120 may determine that the detected user input is associated with aspects of user interfaces 114 and may send an indication of the one or more touch events to application module 124 for further interpretation.

Application module 124 represents an independent, machine-readable, executable, package, program, routine or container that is made up of one or more object files and other files that, when executed, operate at an application layer of computing device 110. Computing device 110 may execute instructions associated with application module 124, to perform a function or provide a service. For example, application module 124 may perform functions such as outputting information to UI module 120 for causing user interfaces 114 to be rendered and output for display. Although examples of application module 124 are too numerous to list in their entirety, application module 124 may include, to provide a few examples of categories of different applications, business or productivity applications, developer tools, educational applications, entertainment applications, financial applications, game applications, graphic or design applications, health and fitness applications, lifestyle or assistant applications, medical applications, music applications, news applications, photography, video, and other multimedia applications, reference applications, social networking applications, sports applications, travel applications, utility applications, weather applications, communication applications, calendar applications, or any other category or type of application.

The machine-readable instructions that make up application module 124 are compiled from source code 116 into object code, byte code, or other machine-executable instructions. Source code 116 may include one or more files of human-readable instructions, written in a programming language, that are created manually by one or more human developers or automatically generated by one or more machines. A compiler, such as compiler modules 122 and 162, may interpret the human-readable instructions of source code 116 and compile the instructions into machine-readable instructions or so-called "object files" that make up machine-executable code (e.g., byte code).

The one or more files (e.g., textual files) that make up source code 116 may be segmented into a sequential "lines" of source code. Each "line" of source code may be associated with a particular programming instruction, or portion thereof. A single programming instruction may span a single, or multiple lines of source code 116. For example, a rendering instruction stated in source code 116 may start on one line and end on a different line thereby spanning a range of sequential lines of source code 116.

The instructions contained in source code 116 may define user interfaces 114. User interfaces 114 may be any type of graphical user interface made up of graphical content that provides user controls into, and conveys output associated with, application module 124. Examples of graphical content include: images, graphics, text, animations, and any other type of graphical content that computing device 110 may display UIC 112. User interfaces 114 may include dynamic content (e.g., one or more dynamic components) that changes according to changes in state of application module 124. Additionally, or alternatively, user interfaces 114 may include static content (e.g., one or more static components) that remains consistent between successive renderings of user interfaces 114, despite changes in the state of application module 124.

Source code 116 may define a view hierarchy associated with application module 124 that represents a state of user interfaces 114 during different points of execution of application module 124. The view hierarchy may be representable as a tree of GUI views. As the state of application module 124 changes, due user interactions with user interface 114, or in response to other information obtained by application module 124, application module 124 may need to update the GUI views to cause user interfaces 114 to convey the current state of application module 124.

For example, user interface 114A is an initial rendering of user interfaces 114 and may be defined by a first GUI view. User interface 114A includes dynamic components 132A and 132B as well as static components 134A and 134B. User interface 114B represents a subsequent rendering of user interfaces 114 that replaces the initial rendering of user interface 114A and may be defined by one or more second GUI views. Like user interface 114A, user interface 114B also includes static components 134A and 134B because static components 134A and 134B represent static content that remains consistent between successive renderings of user interfaces 114, despite changes to the state of application module 124. Unlike the first GUI view that defines user interface 114A, however, the one or more second GUI views that define user interface 114B specify different dynamic content than user interface 114A. Due to the rendering of user interface 114B, the dynamic components 132A and 132B of user interface 114A as defined in the first GUI view are replaced, with dynamic components 132A' and 132B' as defined in the one or more second GUI views. Application module 124 may execute instructions that configure application module 124 to manage user interfaces 114, from one rendering to the next.

A common way of updating a view hierarchy may be for an application to "walk" the tree of GUI views, manually manipulating nodes of the tree, via specific rendering calls being made along the way. Manual view manipulation can be complicated and may sometimes introduce errors during rendering. Manual manipulation requires, during each rendering, an application to identify and execute rendering functions associated each individual node of a tree of GUI views that needs updating from one state to the next. Applications that perform rendering may encounter illegal states, for example, an update of one node of the tree of GUI views inadvertently conflicts in an unexpected way with another node of the tree of GUI views (if, for example, an application tries to set a value on a node that the application has previously removed from the view hierarchy). When it comes to manual manipulation, GUI maintenance complexity may grow exponentially with an increase in quantity of views of a view hierarchy, that require updating. With increases in computing performance over the years, other techniques for maintaining a GUI view have been tried.

Some systems rely on a declarative programming model that simplifies a developer's burden developing program instructions for maintaining and updating a GUI. Some developers prefer to use declarative programming for defining a view hierarchy because declarative programming can make the source code more modular, easier to read, and easier to understand. A declarative GUI model may give the appearance of re-generating an entire GUI view, from scratch, each time the GUI view needs rendering thereby avoiding the complexity of manually maintaining a view hierarchy. However, a purely declarative GUI model that re-generates an entire GUI view, from scratch, each time the GUI view needs rendering may consume an unnecessary amount of computing resources and electrical energy executing an entire set of rendering instructions, for an entire view hierarchy, during each rendering.

In accordance with techniques of this disclosure, application module 124 perform "static reconciliation" to maintain the view hierarchy of user interfaces 114. Static reconciliation may enable use of declarative programming to specify a view hierarchy (given a current state of application module 124), and during compilation, compiler module 122 determines how to efficiently transform an existing view hierarchy into the developer's desired view hierarchy.

Compiler modules 122 and 162 are examples of compilers configured to perform aspects of static reconciliation. Compiler module 122 is a locally executed compiler whereas compiler module 162 represents a remote compiler or remote compiling service. Other than their respective execution environments being different, compiler modules 122 and 162 each take source code 116 as input and generate object files that make up application executables, such as application module 124. Compiler modules 122 and 162 may be stand-alone compilers, compiler sub-components, compiler sub-modules, compiler plugins, or any other type of module or sub-module configured to perform static reconciliation techniques during compilation of source code 116.

Compiler modules 122 and 162 may be two stage compilers. For example, compiler module 122 may compile high-level source code from a highest-level, down to one or more intermediary levels, and then compile the intermediary levels of source code down to the machine-readable form. For example, compiler module 122 may compile source code from a high-level language down to a language that's operating system specific. A second stage of compiler module 122 may compile the operating system specific code into a machine-independent form of code for executing locally on a computing device that executes the specific operating system. Compiler module 122 may compile the same source code from the high-level language down to a different language that's operating system specific. The second stage of compiler module 122 may compile the second version of operating system specific code into a machine-independent form of code for executing locally on a computing device that executes the different operating system.

In some examples, compiler modules 122 and 162 are just-in-time (JIT) compilers. Just-in-time compilers compile an application program for execution, at run time instead of compiling the application program prior to execution. For example, compiler modules 122 may continuously compile or otherwise convert source code, byte code, or other high-level language to machine code while the application is executing. Compiler modules 122 and 162 may continuously analyze a program's execution and perform recompilation when it is determined that performance improvements can be achieved in a way that outweighs any reduction to computation resources to perform the recompilation. Compiler modules 122 and 162 may perform JIT compilation by performing a combination of ahead-of-time compilation (AOT) with interpretation. For ease of description, static reconciliation techniques are primarily described as being performed by compiler module 122, although compiler module 162 may perform similar, if not identical, techniques related to static reconciliation.

Compiler module 122 may provide a declarative application programming interface (API) that enables applications, including application module 124, to render a GUI without imperatively mutating each individual, frontend GUI view. As an example, a developer may declare, within source code 116, components of a view hierarchy of user interfaces 114, just as the developer would normally specify a view hierarchy, i.e., using declarative programming and without having to specify the logic required to reconcile the view hierarchy between renderings, e.g., from one application state change to the next.

Like a programming function or sub-routine, a component is a reusable building block of source code. These building blocks may be sophisticated and application-specific features. For instance, a contact manager application might define a person component that renders a particular graphical element to display contact data. Every component, by definition, has or is a render function that is invoked whenever the component's view hierarchy may require updating (such as when some application data changes and the view needs to reflect the new data). A component's render function uses a set of attributes, defined by the component, to generate a desired view hierarchy by executing appropriate statements. In theory, a render of a particular component could be requested every frame (e.g., 60 times per second), as would be the case to handle an animation or other rapidly changing view hierarchy. A component may need re-rendering for many reasons, including: the component was previously not visible, but is now visible, the component's data has changed, the component is animating and needs to draw the next frame, or a display at which the component is displayed has rotated, been resized, or otherwise changed layout characteristics. Compiler module 122 may compile an application to ensure each component's view hierarchy is updated when rendered, to reflect a desired view hierarchy.

Instead of requiring the developer to specify a way to reconcile a view hierarchy between renderings, compiler module 122 generates object code that maintains and reconciles the view hierarchy, automatically. Compiler module 122 includes the generated object code as part of the rest of the object code that compiler module generates when compiling source code 116 into application module 124.

In operation, compiler module 122 may perform static reconciliation for rendering user interfaces 114 of application module 124. Compiler module 122 may receive source code 116 as inputted source code associated with user interfaces 114. Upon receipt, compiler module 122 may parse source code 116 and perform other analysis of source code 116 to compile source code 116 into machine-executable instructions, including rendering instructions for rendering a view hierarchy of user interfaces 114. One thing that makes compiler module 122 unique from other compilers of application source code, is that compiler module 122 may generate two sets of rendering instructions for rendering a view hierarchy of user interfaces 114.

Compiler module 122 may generate a first set of rendering instructions that are to be executed during an initial rendering of user interfaces 114. For example, user interface 114A may be an initial rendering of user interfaces 114 and may be output for display at UIC 112 when application module 124 begins displaying user interfaces 114. The rendering instructions executed by application module 124 and/or UI module 120 to display user interface 114A may be part of the first set of rendering instructions generated by compiler module 122. Also referred to as a set of initial rendering instructions, the first set of rendering instructions include instructions for rendering both static and dynamic graphical components of user interfaces 114, during the initial rendering of user interfaces 114. For example, the set of initial rendering instructions may include instructions for rendering dynamic components 132A and 132B as well as instructions for rendering static components 134A and 134B.

Compiler module 122 may generate a second, consolidated set of rendering instructions that are to be executed during subsequent renderings of user interfaces 114. For example, user interface 114B may be a subsequent rendering of user interfaces 114 and may be output for display at UIC 112 after application module 124 changes state from when application module 124 first began displaying user interface 114A. The rendering instructions executed by application module 124 and/or UI module 120 to display user interface 114B may be part of the second set of rendering instructions generated by compiler module 122. Also referred to as a set of update rendering instructions, the second set of rendering instructions include instructions for rendering the dynamic and not the static graphical components, during subsequent renderings of user interfaces 114, during the subsequent renderings of user interfaces 114. For example, the set of update rendering instructions may include instructions for rendering dynamic components 132A' and 132B' without any instructions for rendering static components 134A and 134B.

During execution of application module 124, application module 124 may execute the two sets of rendering instructions for displaying user interfaces 114. After executing the set of initial rendering instructions during an initial rendering of user interfaces 114 (e.g., user interface 114A), and during each subsequent rendering of user interfaces 114 (e.g., user interface 114B), application module 124 may refrain from executing the set of initial rendering instructions and instead execute the set of update rendering instructions.

FIG. 2 is a conceptual diagram that further aids in understanding "static reconciliation" techniques. The conceptual diagram of FIG. 2 illustrates example source code that has been mutated into a set of initial rendering instructions and a set of update rendering instructions for performing static reconciliation to render a graphical user interface of an application, in accordance with techniques of the disclosure. FIG. 2 includes a portion of source code 216, as an example of source code 116. FIG. 2 illustrates how a compiler, such as compiler 122 of FIG. 1, may decompose source code 216 into a set of initial rendering instructions 218A and a set of update rendering instructions 218B when compiling an application so the application may perform static reconciliation.

Compiler 122 may receive source code 216 as input. During compilation of source code 216, compiler 122 may create one or more sets of object code defining two different sets of rendering instructions 218A and 218B, e.g., for rendering user interfaces 114. In some examples, the set of initial rendering instructions 218A may include the set of update rendering instructions 218B. For example, the set of initial rendering instructions 218A and the set of update rendering instructions 218B may together form a set of total rendering instructions initially executed during an initial rendering cycle. In such an example, the set of initial rendering instructions 218A and the set of update rendering instructions 218B may be executed concurrently.

At a high level, compiler 122 may identify any dynamic objects from source code 216, specifically, by identifying any objects in source code 216 that specify graphical components of the view hierarchy that include dynamic attributes that can or do change from one rendering to the next. Compiler 122 may identify any static objects from source code 216, for example, by identifying any objects in source code 216 that specify graphical components of the view hierarchy that do not include any dynamic attributes and instead only include static attributes that remain constant from one rendering to the next.

Compiler 122 may generate a set of initial rendering instructions 218A by packaging rendering instructions together so that, when executed during an initial rendering of a view hierarchy, both the dynamic components and the static components are rendered as part of the view hierarchy. Compiler 122 may generate a set of update rendering instructions 218B by packaging rendering instructions together so that, when executed during any subsequent rendering of a view hierarchy, the dynamic components, and not the static components, are re-rendered as part of updating the view hierarchy.

For example, as shown in FIG. 2, source code 216 includes instructions associated with a dynamic component of a graphical user interface. The dynamic component is called "AboutPageComponent" and includes a set of rendering instructions that, when executed as part of an application module, cause the dynamic component to get rendered and displayed. AboutPageComponent includes mostly static attributes, including a name attribute with a static value "My Fancy App Name" and a description attribute with a static value "My app is a todo list that is very fancy." In addition to static attributes, the AboutPageComponent also includes a dynamic attribute called a version attribute that includes a dynamic value assigned to a variable "appVersion". While the values assigned to the name and description attributes may never change from one rendering to the next, the version attribute can and may change between renderings.

Compiler module 122 may decompose source code 216 into a set of initial rendering instructions 218A for initially rendering the AboutPageComponent, and a set of update rendering instructions 218B for subsequently rendering the AboutPageComponent. The set of initial rendering instructions 218A include rendering instructions that define how to render at least the static attributes of the AboutPageComponent. In some examples, the set of initial rendering instructions 218A also include rendering instructions that define how to render the dynamic attributes of the AboutPageComponent. The set of update rendering instructions 218B, however, only include rendering instructions that define how to render the dynamic attributes of the AboutPageComponent but not the static attributes since rendering the static attributes is not necessary as their values do not change between renderings.

Instead of creating allocating a VDOM at runtime, compiler 122 may perform static analysis at compile time and generate optimized object code (e.g., byte code) based on instructions 218A and 218B that minimizes object allocations during view hierarchy reconciliation. Compiler module 122 may avoid executing VDOM allocations by generating object code (e.g., byte code) that in-lines or "encodes" view hierarchy updates within the rendering instructions for each component. As such, instead of instantiating a VDOM that is subsequently passed to a generic reconciler, compiler module 122 may create an application module that renders using fewer object allocations and therefore, may consume less memory during run-time and/or may consume less electrical energy maintaining and evaluating VDOM allocations during every rendering. As such, by performing static reconciliation, compiler module 122 can utilize information determined from source code 216, at compile time, to reduce a total amount of work performed later on, during reconciliation.

For example, many aspects of a component's sub-view-hierarchy are statically knowable at compile time. A component may use a linear layout for a sub-view hierarchy, or may have an image (e.g., a product logo) that never changes. Adding nodes to a VDOM tree would require allocating an individual VDOM node for each component attribute, whether constant over time or dynamic. IN addition, each render would require maintaining these nodes, setting their values, visiting the nodes during reconciliation, and comparing the nodes to the nodes of prior VDOM trees to determine whether there were any differences. However, visiting nodes, during reconciliation, that are associated with attributes of a component that never change may be a waste of computing resources. Compiler 122 may create object code and compile an application executable to contain logic that ignores the attributes that remain static, when re-rending a component view.

Information which is known at compile time can be used to prune the set of checks that need to be generated. Some constructs, such as loops, may still require allocations. However, in general, compiler 122 may generate object code that requires a fraction of the total quantity of comparisons that would otherwise be performed using VDOM reconciliation. The comparisons performed during static reconciliation are a strict subset of the comparisons that would have been performed by a VDOM reconciler. Indeed, a naive implementation of a code generator might just emit the exact reconciliation code that would have been executed by a VDOM reconciler.

Figure 3:
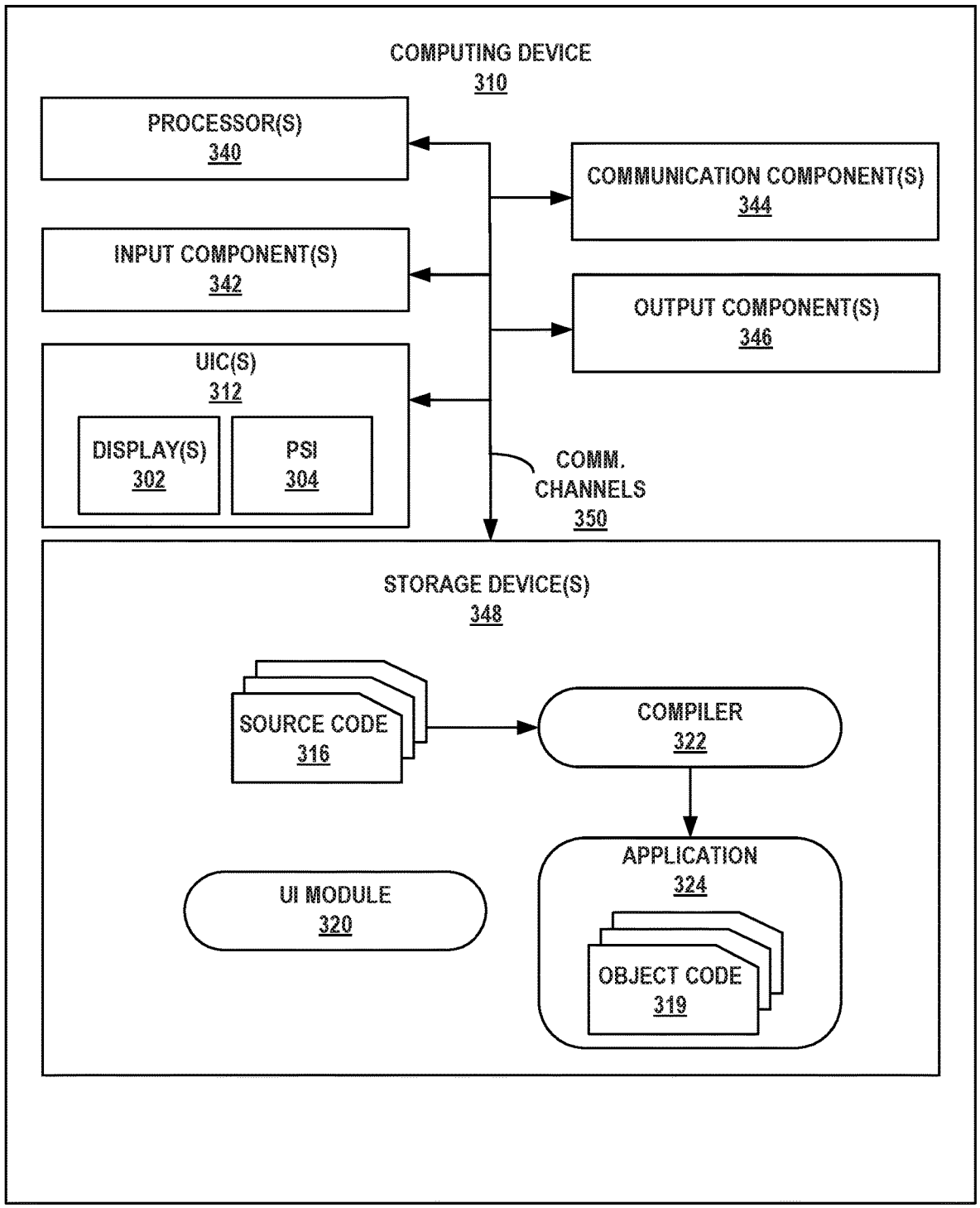
FIG. 3 is a block diagram illustrating an example computing system configured to perform static reconciliation for rendering a graphical user interface of an application, in accordance with techniques of the disclosure.

FIG. 3 is a block diagram illustrating an example computing device configured to perform static reconciliation for rendering a graphical user interface of an application, in accordance with techniques of the disclosure. Computing device 310 of FIG. 3 is an example of computing device 110 of FIG. 1 and is described in the context of computing device 110. Computing device 310 may include some or all of the capabilities of computing device 110. FIG. 3 illustrates only one particular example of computing device 310, and many other examples of computing device 310 may be used in other instances and may include a subset of the components included in example computing device 310 or may include additional components not shown in FIG. 3.

As shown in the example of FIG. 3, computing device 310 includes one or more user interface components (UIC) 312, one or more processors 340, one or more input components 342, one or more communication units 344, one or more output components 346, and one or more storage components 348. UIC 312 includes display component 202 and presence-sensitive input (PSI) component 204.

Storage components 348 of computing device 310 also includes UI module 320, compiler module 322, and application module 324. Additionally, storage components 248 includes source code 316 and within application module 324 is object code 319.

Communication channels 350 may interconnect each of the components 302, 304, 312, 316, 319, 320, 322, 324, 340, 342, 344, 346, and 348 for inter-component communications (physically, communicatively, and/or operatively). In some examples, communication channels 350 may include a system bus, a network connection, an inter-process communication data structure, or any other method for communicating data.

One or more input components 342 of computing device 310 may receive input. Examples of input are sensor, tactile, audio, and video input. Input components 342 of computing device 300, in one example, includes a presence-sensitive display, touch-sensitive screen, sensor, mouse, keyboard, voice responsive system, video camera, microphone or any other type of device for detecting input from a human or machine. In some examples, input components 342 include one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like).

One or more output components 346 of computing device 310 may generate output. Examples of output are tactile, audio, and video output. Output components 346 of computing device 310, in one example, includes a presence-sensitive display, sound card, video graphics adapter card, speaker, cathode ray tube (CRT) monitor, liquid crystal display (LCD), or any other type of device for generating output to a human or machine.

One or more communication units 344 of computing device 310 may communicate with external devices via one or more wired and/or wireless networks by transmitting and/or receiving network signals on the one or more networks. Examples of communication unit 244 include a network interface card (e.g. such as an Ethernet card), an optical transceiver, a radio frequency transceiver, a GPS receiver, or any other type of device that can send and/or receive information. Other examples of communication units 344 may include short wave radios, cellular data radios, wireless network radios, as well as universal serial bus (USB) controllers.

UIC 312 of computing device 310 is an example of UIC 112 of computing device 110. For example, UIC 312 may display a graphical user interface, such as user interfaces 114, from which a user of computing device 310 may provide input to, or review output from, computing device 310.

UIC 312 includes display component 302 and PSI component 304. Display component 302 may be a screen at which information is displayed by UIC 312 and PSI component 304 may detect an object at and/or near display component 302. As one example range, presence-sensitive input component 304 may detect an object, such as a finger or stylus that is within two inches or less of display component 302. Presence-sensitive input component 304 may determine a location (e.g., an [x,y] coordinate) of display component 302 at which the object was detected. In another example range, presence-sensitive input component 304 may detect an object six inches or less from display component 302 and other ranges are also possible. PSI component 304 may determine the location of display component 302 selected by a user's finger using capacitive, inductive, and/or optical recognition techniques. In some examples, presence-sensitive input component 304 also provides output to a user using tactile, audio, or video stimuli as described with respect to display component 302.

While illustrated as an internal component of computing device 310, UIC 312 may also represent and external component that shares a data path with computing device 310 for transmitting and/or receiving input and output. For instance, in one example, UIC 312 represents a built-in component of computing device 310 located within and physically connected to the external packaging of computing device 310 (e.g., a screen on a mobile phone). In another example, UIC 312 represents an external component of computing device 310 located outside and physically separated from the packaging of computing device 310 (e.g., a monitor, a projector, etc. that shares a wired and/or wireless data path with a tablet computer).

One or more processors 340 may implement functionality and/or execute instructions within computing device 310. For example, processors 340 on computing device 310 may receive and execute instructions stored by storage components 348 that execute the functionality of modules 320, 322, and 324. The instructions executed by processors 340 may cause computing device 310 to store information within storage components 348 during program execution. Examples of processors 340 include application processors, display controllers, sensor hubs, and any other hardware configure to function as a processing unit. Modules 320, 322, and 324 may be operable by processors 340 to perform various actions or functions of computing device 310.

One or more storage components 348 within computing device 310 may store information for processing during operation of computing device 310 (e.g., computing device 310 may store data accessed by modules 320, 322, and 324 during execution at computing device 310). In some examples, storage component 348 is a temporary memory and in other examples, storage component 348 is a computer-readable storage medium.

As a memory, a primary purpose of storage component 348 may not be configured for long-term storage but rather, may be configured for short-term storage of information as volatile memory and therefore not retain stored contents if computing device 310 is powered off. Examples of volatile memories include random access memories (RAM), dynamic random-access memories (DRAM), static random access memories (SRAM), and other forms of volatile memories known in the art. Storage components 348, in some examples, also include one or more computer-readable storage media. Storage components 348 may be configured to store larger amounts of information than volatile memory.

Storage components 348 may be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 348 may store program instructions and/or information (e.g., data) associated with modules 320, 322, and 324.

UI module 320 is an example of UI module 120 of FIG. 1 and manages inputs to and outputs from UIC 312 on behalf of modules 322, 324, and any other applications or modules installed on computing device 310. For example, UI module 320 may direct indications of inputs received by PSI component 304 to compiler module 322 and application module 324. UI module 320 may direct indications of output to display component 302 that are received from modules 322 and 324.

Application module 324 is an example of application module 124 of FIG. 1. Application module 324 is made up of object code 319. Application module 324 may be referred to as an executable or package made up of one or more files, including object code 319.

Compiler module 322 is an example of compiler module 122 and 162 of FIG. 1. Compiler module 322 is configured to take source code 316 as input and in response, generate object code 319. Compiler module 322 is configured to perform static reconciliation when compiling source code 316, which, as indicated above in the description of FIG. 1, means that compiler module 322 may generate object code 319 so as to define at least two different sets of rendering instructions based on source code 318.

For example, compiler module 322 may parse source code 322 into two types of objects. Compiler module 322 may identify a set of dynamic objects that each include one or more dynamic attributes that can change between renderings. In addition, compiler module 322 may identify a set of static objects that do not include any dynamic attributes and therefore do not change between renderings.

Compiler module 322 may take the sets of dynamic and static objects and generate a set of initial rendering instructions for rendering the dynamic and static objects during an initial rendering of a GUI associated with application module 324. In addition, compiler module 322 may take just the set of dynamic objects and generate a set of update rendering instructions for re-rendering the dynamic objects that may change over time, without re-rendering the static objects, during subsequent renderings of the GUI associated with application module 324. For example, see rendering instructions 218A and 218B of FIG. 2 as example sets of initial and update rendering instructions generated from source code 216.

In some examples, to further improve efficiencies in managing and rendering a GUI, compiler module 322 may perform automatic keying techniques to ensure that dynamic objects in a GUI are rendered correctly. Compiler module 322 may generate rendering instructions such that each dynamic object is assigned a unique identifier. With the unique identifier, compiler module 322 may ensure that rendering instructions associated with one dynamic object do not get misinterpreted for a different, similar dynamic object.

Compiler module 322 may determine whether any dynamic graphical components of a GUI are duplicated in the GUI. For example, two or more GUI controls (e.g., buttons, text boxes, and the like) may appear similar in form or function when displayed as part of a GUI. To ensure that updates for a particular dynamic graphical component do not accidentally cause an update to a different, similar dynamic graphical component, compiler module 222 may automatically assign a respective key to each dynamic graphical component that is duplicated in the GUI. Compiler module 322 may generate renderings instructions for the graphical components of the GUI that incorporate the respective keys so that during execution, the correct rendering instructions are executed to update a particular graphical component. Said differently, compiler module 322 may generate respective rendering instructions for each dynamic graphical component that is duplicated in a GUI that are uniquely identifiable according to the respective key.

In some cases, compiler module 322 may generate keys based on features of source code 318. As one example, compiler module 322 may generate a respective key assigned to each dynamic graphical component that is duplicated in a GUI based on a position from within source code 318 where the dynamic graphical component is referenced. For example, the position used by compiler module 322 may be based on a respective line number, within source code 318, where the dynamic graphical component is referenced. As another example, the position used by compiler module 322 may be based on a respective position of a first byte of the set of rendering instructions occur within source code 318 that define each of the dynamic graphical components. This way, when compiler module 322 generates object code 316, compiler module 322 may incorporate rendering instructions that get executed in-line, with particular sections of the in-line rendering instructions being assigned to particular dynamic objects that match the respective keys.

Figure 4:
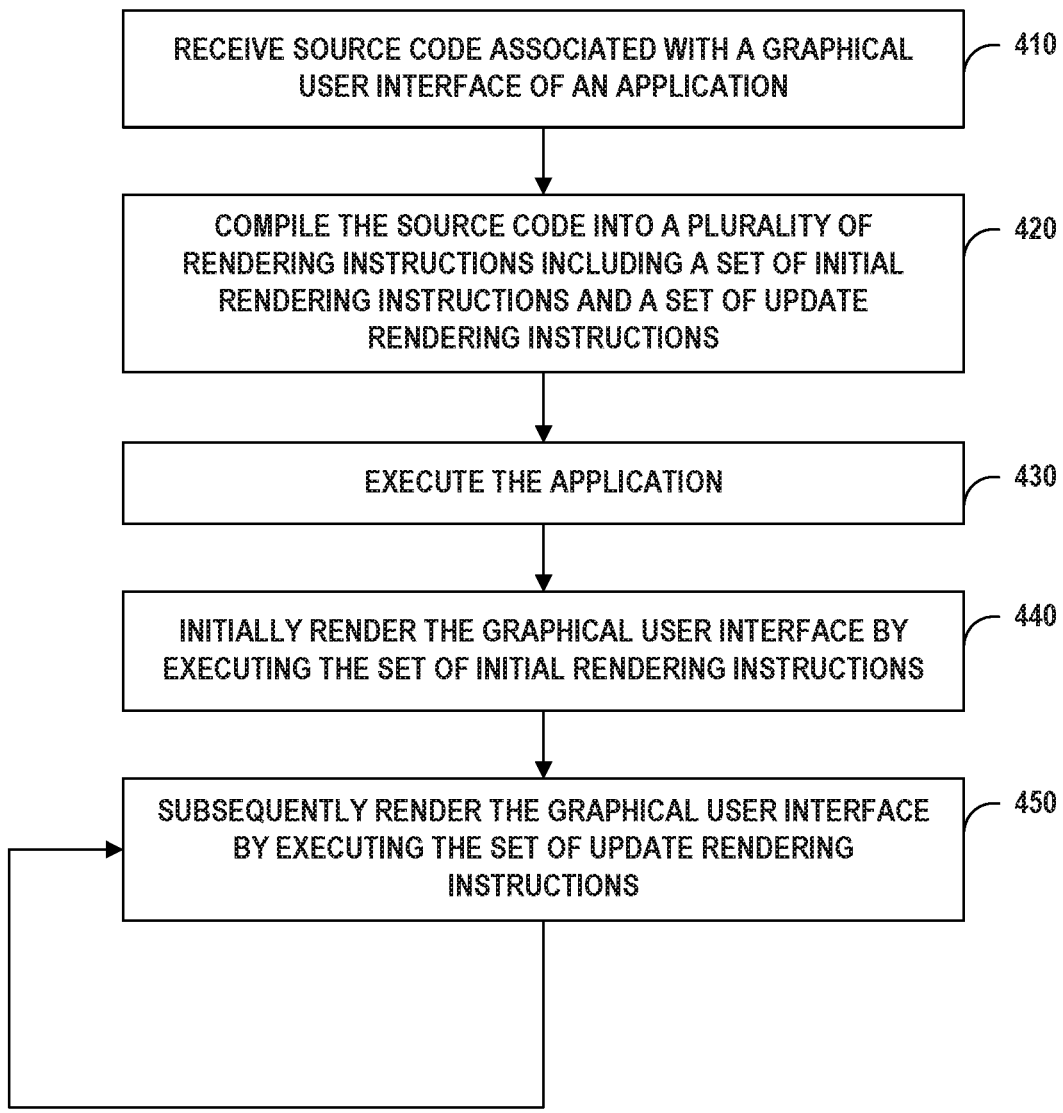
FIG. 4 is a flowchart illustrating example operations performed by a computing system that is configured to perform static reconciliation for rendering a graphical user interface of an application, in accordance with techniques of the disclosure.

FIG. 4 is a flowchart illustrating example operations performed by a computing system that is configured to perform static reconciliation for rendering a graphical user interface of an application, in accordance with techniques of the disclosure. FIG. 4 is described in the context of computing device 110 of FIG. 1.

In operation, computing device 110 may compile application source code into one or more object files of an application using static reconciliation techniques. As an initial step, computing device 110 may receive source code associated with a graphical user interface of an application (410). For example, compiler module 122 may receive source code 116 as a file input received via a developer user interface presented at UIC 112. A developer may write code at the developer user interface and interact with the developer user interface to cause compiler 122 to load and begin analyzing source code 116.

Computing device 110 may compile the source code into a plurality of rendering instructions including a set of initial rendering instructions and a set of update rendering instructions (420). For example, when commanded by a user of computing device 110 to compile source code 116, compiler module 122 may perform static reconciliation by separating parts of source code 116 into two sets of instructions: a first set associated with dynamic objects and a second set associated with static objects. Compiler module 122 may generate object code (e.g., object code 319) that includes two sets of rendering instructions. A first set of rendering instructions may, when executed as part of application module 124, cause UIC 112 to display both static and dynamic objects (e.g., user interface 114A). A second set of rendering instructions may, when executed as part of application module 124, cause UIC 112 to display updates just to the dynamic objects without changing the static objected (e.g., user interface 114B). Compiler module 122 may, during compilation, automatically assign a respective key to one or more of the subset of graphical components, where the set of update rendering instructions for rendering each of the one or more of the subset of graphical components are uniquely identifiable according to the respective key.

Computing device 110 may execute the application (430). For instance, a processor of computing device 110 (e.g., processors 240) may execute application 124 and in so doing, execute the two sets of rendering instructions created in step 420.

Computing device 110 may initially render the graphical user interface by executing the set of initial rendering instructions (440). Specifically, during an initial rendering of a GUI associated with application module 124, computing device 110 may execute the first set of "initial" rendering instructions to cause UIC 112 to display user interface 114A.

Computing device 110 may subsequently, and in some examples repeatedly, render the graphical user interface by executing the set of update rendering instructions (450). For instance, during each rendering of the GUI associated with application module 124 that occurs after the initial rendering, computing device 110 may execute the second set of "update" rendering instructions to cause UIC 112 to display user interface 114B.

When executing application module 124, computing device 110 may disambiguate similar or duplicate dynamic graphical components by relying on respective key embeddings in the respective rendering instructions of each dynamic component. For example, if dynamic component 132A and 132B reuse similar rendering functions and appear similar within user interface 114A, compiler 122 may embed a unique key or other identifier in the rendering instructions for components 132A and 132B so that updates made to render user interface 114A occur at the appropriate component 132A' or 132B' without bleeding over into the other component 132A' or 132B'. By automatically keying dynamic components of a GUI in this way, and generating in-line, machine-readable instructions for rendering the dynamic components, a computing device, such as computing device 110 may render a GUI more efficiently and with less errors than other computing device, for instance, those that rely on manual (i.e., developer initiated) keying techniques and the like.

Various aspects of the techniques described in this disclosure may be directed to the examples listed below.

Example 1. A method for performing static reconciliation for rendering a graphical user interface of an application, the method comprising: receiving, by at least one processor, source code associated with the graphical user interface of an application; compiling the source code into a plurality of rendering instructions for rendering a view hierarchy of the graphical user interface, wherein the view hierarchy defines graphical components of the graphical user interface, and wherein the plurality of rendering instructions include: a set of initial rendering instructions for rendering the graphical components, during an initial rendering of the graphical user interface; and a set of update rendering instructions for rendering a subset of the graphical components, during subsequent renderings of the graphical user interface, and automatically assigning, during compilation of the source code, a respective key to one or more of the subset of graphical components, wherein the set of update rendering instructions for rendering each of the one or more of the subset of graphical components are uniquely identifiable according to the respective key; and executing the plurality of rendering instructions to update the one or more of the subset of graphical components identified by the respective key.

Example 2. The method of example 1, wherein executing the plurality of rendering instructions comprises: after executing the set of initial rendering instructions during an initial rendering of the graphical user interface: during each subsequent rendering of the graphical user interface, refraining from executing the set of initial rendering instructions and executing the set of update rendering instructions to update the one or more of the subset of graphical components identified by the respective key.

Example 3. The method of example 1, wherein compiling the plurality of rendering instructions comprises: identifying a set of dynamic objects from the source code that include one or more dynamic attributes; and identifying a set of static objects from the source code that do not include any dynamic attributes, wherein the set of initial rendering instructions include instructions for rendering both the set of dynamic objects and the set of static objects, and wherein the set of update rendering instructions include instructions for rendering the set of dynamic objects but not the set of static objects.

Example 4. The method of example 1, wherein compiling the plurality of rendering instructions further comprises: determining whether any of the graphical components are duplicated in the graphical user interface; automatically assigning the respective key to each of the graphical components that is duplicated in the graphical user interface, wherein respective rendering instructions from the plurality of rendering instructions for each graphical component that is duplicated in the graphical user interface are uniquely identifiable according to the respective key.

Example 5. The method of example 4, further comprising: generating the respective key assigned to each graphical component that is duplicated in the graphical user interface based on a position from within the source code where the dynamic graphical component is referenced.

Example 6. The method of example 5, wherein the position comprises a respective position of a first byte where the plurality of rendering instructions for each of the graphical component resides within the source code.

Example 7. The method of example 1, wherein the plurality of rendering instructions comprise in-line rendering instructions compiled into machine-readable code.

Example 8. A device configured to perform static reconciliation for rendering a graphical user interface of an application, the device comprising: one or more processors configured to: receive source code associated with the graphical user interface of an application; compile the source code into a plurality of rendering instructions for rendering a view hierarchy of the graphical user interface, wherein the view hierarchy defines graphical components of the graphical user interface, and wherein the plurality of rendering instructions include: a set of initial rendering instructions for rendering the graphical components, during an initial rendering of the graphical user interface; and a set of update rendering instructions for rendering a subset of the graphical components, during subsequent renderings of the graphical user interface, and automatically assign, during compilation of the source code, a respective key to one or more of the subset of graphical components, wherein the set of update rendering instructions for rendering each of the one or more of the subset of graphical components are uniquely identifiable according to the respective key; and execute the plurality of rendering instructions to update the one or more of the subset of graphical components identified by the respective key; and a display configured to present the graphical components.

Example 9. The device of example 8, wherein the one or more processors are configured to: after executing the set of initial rendering instructions during an initial rendering of the graphical user interface: during each subsequent rendering of the graphical user interface, refrain from executing the set of initial rendering instructions and executing the set of update rendering instructions to update the one or more of the subset of graphical components identified by the respective key.

Example 10. The device of example 8, wherein the one or more processors are configured to: identify a set of dynamic objects from the source code that include one or more dynamic attributes; and identify a set of static objects from the source code that do not include any dynamic attributes, wherein the set of initial rendering instructions include instructions for rendering both the set of dynamic objects and the set of static objects, and wherein the set of update rendering instructions include instructions for rendering the set of dynamic objects but not the set of static objects.

Example 11. The device of example 8, wherein the one or more processors are configured to: determine whether any of the graphical components are duplicated in the graphical user interface; automatically assign the respective key to each of the graphical components that is duplicated in the graphical user interface, wherein respective rendering instructions from the plurality of rendering instructions for each graphical component that is duplicated in the graphical user interface are uniquely identifiable according to the respective key.

Example 12. The device of example 11, wherein the one or more processors are further configured to: generate the respective key assigned to each graphical component that is duplicated in the graphical user interface based on a position from within the source code where the dynamic graphical component is referenced.

Example 13. The device of example 12, wherein the position comprises a respective position of a first byte where the plurality of rendering instructions for each of the graphical component resides within the source code.

Example 14. The device of example 8, wherein the plurality of rendering instructions comprise in-line rendering instructions compiled into machine-readable code.

Example 15. A non-transitory computer-readable storage medium having stored thereon instructions that, when executed, cause one or more processors to: receive source code associated with the graphical user interface of an application; compile the source code into a plurality of rendering instructions for rendering a view hierarchy of the graphical user interface, wherein the view hierarchy defines graphical components of the graphical user interface, and wherein the plurality of rendering instructions include: a set of initial rendering instructions for rendering the graphical components, during an initial rendering of the graphical user interface; and a set of update rendering instructions for rendering a subset of the graphical components, during subsequent renderings of the graphical user interface, and automatically assign, during compilation of the source code, a respective key to one or more of the subset of graphical components, wherein the set of update rendering instructions for rendering each of the one or more of the subset of graphical components are uniquely identifiable according to the respective key; and execute the plurality of rendering instructions to update the one or more of the subset of graphical components identified by the respective key.

Example 16. The non-transitory computer-readable storage medium of example 15, wherein the instructions, when executed, cause the one or more processors to: after executing the set of initial rendering instructions during an initial rendering of the graphical user interface: during each subsequent rendering of the graphical user interface, refrain from executing the set of initial rendering instructions and executing the set of update rendering instructions to update the one or more of the subset of graphical components identified by the respective key.

Example 17. The non-transitory computer-readable storage medium of example 15, wherein the instructions, when executed, cause the one or more processors to: identify a set of dynamic objects from the source code that include one or more dynamic attributes; and identify a set of static objects from the source code that do not include any dynamic attributes, wherein the set of initial rendering instructions include instructions for rendering both the set of dynamic objects and the set of static objects, and wherein the set of update rendering instructions include instructions for rendering the set of dynamic objects but not the set of static objects.

Example 18. The non-transitory computer-readable storage medium of example 15, wherein the instructions, when executed, cause the one or more processors to: determine whether any of the graphical components are duplicated in the graphical user interface; and automatically assign the respective key to each of the graphical components that is duplicated in the graphical user interface, wherein respective rendering instructions from the plurality of rendering instructions for each graphical component that is duplicated in the graphical user interface are uniquely identifiable according to the respective key.

Example 19. The non-transitory computer-readable storage medium of example 18, wherein the instructions, when executed, further cause the one or more processors to: generate the respective key assigned to each graphical component that is duplicated in the graphical user interface based on a position from within the source code where the dynamic graphical component is referenced.

Example 20. The non-transitory computer-readable storage medium of example 19, wherein the position comprises a respective position of a first byte where the plurality of rendering instructions for each of the graphical component resides within the source code.

Example 21. The non-transitory computer-readable storage medium of example 15, wherein the plurality of rendering instructions comprise in-line rendering instructions compiled into machine-readable code.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method for performing static reconciliation for rendering a graphical user interface of an application, the method comprising:
   receiving, by at least one processor, source code associated with the graphical user interface of an application;
   compiling the source code once into two sets of rendering instructions for rendering a view hierarchy of the graphical user interface, wherein the view hierarchy defines graphical components of the graphical user interface, and wherein the two sets of rendering instructions include:
      a set of initial rendering instructions for rendering, at run-time, all static and dynamic graphical components of the view hierarchy, during an initial rendering of the graphical user interface; and
      a set of update rendering instructions for rendering, at the run-time, the dynamic graphical components, during subsequent renderings of the graphical user interface; while compiling the source code, automatically assigning, a respective key to each of the dynamic graphical components, wherein the set of update rendering instructions for rendering each of the one or more of the dynamic graphical components are uniquely identifiable according to the respective key;
   initially rendering the graphical user interface by at least executing, at the run-time, the set of initial rendering instructions, wherein the rendering of the graphical user interface includes rendering all of the static graphical components and the dynamic graphical components of the view hierarchy of the graphical user interface; and
   during each subsequent rendering of the graphical user interface and without recompiling the source code:
   executing, at the run-time, the set of update rendering instructions to update the one or more of the dynamic graphical components identified by the respective key; and
   refraining from executing the set of initial rendering instructions.

2. The method of claim 1, wherein compiling the two sets of rendering instructions comprises:
   identifying a set of dynamic objects from the source code that include one or more dynamic attributes; and
   identifying a set of static objects from the source code that do not include any dynamic attributes,
   wherein the set of initial rendering instructions include instructions for rendering both the set of dynamic objects and the set of static objects, and
   wherein the set of update rendering instructions include instructions for rendering the set of dynamic objects but not the set of static objects.

3. The method of claim 1, wherein compiling the two sets of rendering instructions further comprises:
   determining whether any of the graphical components are duplicated in the graphical user interface; and
   automatically assigning the respective key to each of the graphical components that is duplicated in the graphical user interface,
   wherein respective rendering instructions from the two sets of rendering instructions for each graphical component that is duplicated in the graphical user interface are uniquely identifiable according to the respective key.

4. The method of claim 3, further comprises:
   generating the respective key assigned to each graphical component that is duplicated in the graphical user interface based on a position from within the source code where the dynamic graphical component is referenced.

5. The method of claim 4, wherein the position comprises a respective position of a first byte where the two sets of rendering instructions for each of the graphical components resides within the source code.

6. The method of claim 1, wherein the two sets of rendering instructions comprise in-line rendering instructions compiled into machine-readable code.

7. A computing system configured to perform static reconciliation for rendering a graphical user interface of an application, the computing system comprising:
   at least one memory configured to store source code associated with the graphical user interface of an application; and
   at least one processor configured to:
   compile the source code once into two sets of rendering instructions for rendering a view hierarchy of the graphical user interface, wherein the view hierarchy defines graphical components of the graphical user interface, and wherein the two sets of rendering instructions include:
      a set of initial rendering instructions for rendering, at run-time, all static and dynamic graphical components of the view hierarchy, during an initial rendering of the graphical user interface; and
      a set of update rendering instructions for rendering, at the run-time, the dynamic graphical components, during subsequent renderings of the graphical user interface;
   while compiling the source code, automatically assign, a respective key to each of the dynamic graphical components, wherein the set of update rendering instructions for rendering each of the one or more of the dynamic graphical components are uniquely identifiable according to the respective key;
   initially render the graphical user interface by at least executing, at the run-time, the set of initial rendering instructions, wherein the rendering of the graphical user interface includes rendering all of the static graphical components and the dynamic graphical components of the view hierarchy of the graphical user interface; and
   during each subsequent rendering of the graphical user interface and without recompiling the source code:
      execute, at the run-time, the set of update rendering instructions to update the one or more of the dynamic graphical components identified by the respective key; and
      refrain from executing the set of initial rendering instructions.

8. The computing system of claim 7, wherein the at least one processor is configured, when compiling the two sets of rendering instructions, to:
   identify a set of dynamic objects from the source code that include one or more dynamic attributes; and
   identify a set of static objects from the source code that do not include any dynamic attributes,
   wherein the set of initial rendering instructions include instructions for rendering both the set of dynamic objects and the set of static objects, and
   wherein the set of update rendering instructions include instructions for rendering the set of dynamic objects but not the set of static objects.

9. The computing system of claim 7, wherein the at least one processor is configured, when compiling the two sets of rendering instructions, to:
   determine whether any of the graphical components are duplicated in the graphical user interface; and
   automatically assign the respective key to each of the graphical components that is duplicated in the graphical user interface,
   wherein respective rendering instructions from the two sets of rendering instructions for each graphical component that is duplicated in the graphical user interface are uniquely identifiable according to the respective key.

10. The computing system of claim 9, wherein the at least one processor is further configured to:
    generate the respective key assigned to each graphical component that is duplicated in the graphical user interface based on a position from within the source code where the dynamic graphical component is referenced.

11. The computing system of claim 10, wherein the position comprises a respective position of a first byte where the two sets of rendering instructions for each of the graphical components resides within the source code.

12. The computing system of claim 7, wherein the two sets of rendering instructions comprise in-line rendering instructions compiled into machine-readable code.

13. A non-transitory computer-readable storage medium having instructions stored thereon that, when executed, cause one or more processors, when performing static reconciliation for rendering a graphical user interface of an application, to:
    receive source code associated with the graphical user interface of an application; and
    compile the source code once into two sets of rendering instructions for rendering a view hierarchy of the graphical user interface, wherein the view hierarchy defines graphical components of the graphical user interface, and wherein the two sets of rendering instructions include:
       a set of initial rendering instructions for rendering, at run-time, all static and dynamic graphical components of the view hierarchy, during an initial rendering of the graphical user interface; and
       a set of update rendering instructions for rendering, at the run-time, the dynamic graphical components, during subsequent renderings of the graphical user interface;
    while compiling the source code, automatically assign a respective key to each of the dynamic graphical components, wherein the set of update rendering instructions for rendering each of the one or more of the dynamic graphical components are uniquely identifiable according to the respective key;
    initially render the graphical user interface by at least executing, at the run-time, the set of initial rendering instructions, wherein the rendering of the graphical user interface includes rendering all of the static graphical components and the dynamic graphical components of the view hierarchy of the graphical user interface; and
    during each subsequent rendering of the graphical user interface and without recompiling the source code:
       execute, at the run-time, the set of update rendering instructions to update the one or more of the dynamic graphical components identified by the respective key; and refrain from executing the set of initial rendering instructions.

14. The non-transitory computer-readable storage medium of claim 13, wherein the instruction, when execute to compile the two sets of rendering instructions, cause the one or more processors to:
identify a set of dynamic objects from the source code that include one or more dynamic attributes; and
identify a set of static objects from the source code that do not include any dynamic attributes,
wherein the set of initial rendering instructions include instructions for rendering both the set of dynamic objects and the set of static objects, and
wherein the set of update rendering instructions include instructions for rendering the set of dynamic objects but not the set of static objects.

15. The non-transitory computer-readable storage medium of claim 13, wherein the instruction, when executed to compile the two sets of rendering instructions, cause the one or more processors to:
determine whether any of the graphical components are duplicated in the graphical user interface; and
automatically assign the respective key to each of the graphical components that is duplicated in the graphical user interface,
wherein respective rendering instructions from the two sets of rendering instructions for each graphical component that is duplicated in the graphical user interface are uniquely identifiable according to the respective key.

16. The non-transitory computer-readable storage medium of claim 15, wherein the instruction, when executed, further cause the one or more processors to:
generate the respective key assigned to each graphical component that is duplicated in the graphical user interface based on a position from within the source code where the dynamic graphical component is referenced.

17. The non-transitory computer-readable storage medium of claim 16, wherein the position comprises a respective position of a first byte where the two sets of rendering instructions for each of the graphical components resides within the source code.

* * * * *